UNITED STATES PATENT OFFICE.

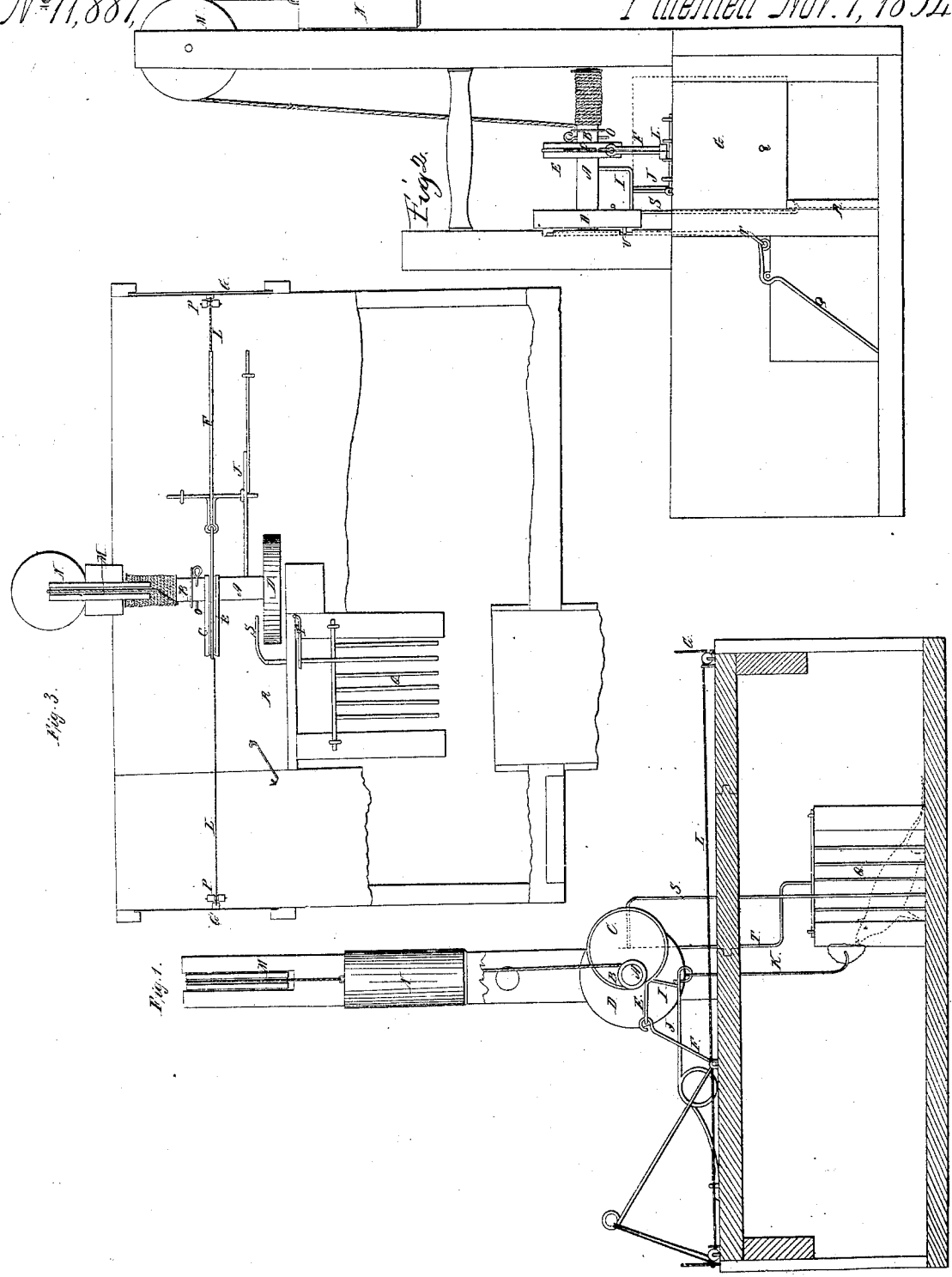

ROBERT S. CRAIG, OF CINCINNATI, OHIO.

TRAP FOR ANIMALS.

Specification of Letters Patent No. 11,887, dated November 7, 1854.

*To all whom it may concern:*

Be it known that I, ROBERT S. CRAIG, of Cincinnati, in the county of Hamilton and State of Ohio, have invented a new and Improved Rat or Game Trap; and I do hereby declare that the following is a full and exact description thereof, reference being had to the accompanying drawing, and to the letters and figures of reference marked thereon. Like letters refer to like parts.

The nature of my invention of a rat or game trap consists in forming such a combination as I consider will most effectually deceive the game intended to be caught, viz., an open passageway at each end, in the middle of which passageway is placed the bait to allure the game, and likewise forming such an arrangement that the game as soon as caught in the passageway, by the closing of a door on each end, in endeavoring to make its escape will pass into another compartment, resetting the doors and opening the passage for the entrance of another and so on until the weight by which the machinery is worked is run down, and likewise the game inclosing itself without a possibility of return, and out of sight of others entering the passage way, and likewise keeping the passageway clean, and exhibiting no taint of having caught one before, and also to permit the game to pass into the passageway without climbing up from the ground or such other level as the trap may be set.

To enable others skilled in the art to make and use my invention I will proceed to describe its construction and operation.

Figure 1 represents a longitudinal section of the trap. Fig. 2 represents a cross or transverse section. Fig. 3 is a plan of the trap.

A, A, Figs. 1, 2 and 3 is the shaft upon which is fixed the roller B, B, Figs. 1, 2 and 3; an eccentric pulley C, C, Figs. 1, 2, and 3, and a catch wheel D, D, Figs. 1, 2, and 3.

To the eccentric pulley is attached a wire E E which is attached to a right angled wire or bell crank, F, F, which bell crank is connected with the doors of the trap G, G, by a string L, L.

I, I Figs. 1 and 2, is a catch by which the action of the trap is regulated.

J, J, is a spring to which is fastened the wire which holds the bait K, Fig. 1.

L, L, are the strings by which the doors are attached to the operating part of the trap.

M, M, is the pulley over which is hung the cord which is wound around the roller B and to the other end of which is suspended the weight N, N.

O, O, Figs. 2 and 3, is a small pin which passes through the roller B and the shaft A to fasten the roller to the shaft, as the roller is simply a cylinder passing around the shaft and entirely separate from it, and by withdrawing the pin the weight may be wound up without moving the rest of the machinery.

P, P, Figs. 1, 2, and 3, are the rollers or pulleys through which the string runs to break the friction.

Q, Q, Figs. 1, 2 and 3, is a door through which the rat passes into the other apartment and as he raises it in passing in, he shuts himself in by letting down a door behind him at R, R, Figs. 2 and 3, which door is connected with the upper works by the wire S, S, Figs. 1, 2, and 3, the wire door Q is also connected with the upper works by the wire T, T, Figs. 1, 2 and 3, which passes up the side of the post, and catches upon a small point of wire U Fig. 2, in the catchwheel D, and when the rat raises the wire door Q, it draws down the wire T thereby setting the upper works free which then reset themselves.

What I claim as my invention and desire to secure by Letters Patent, is—

1. The mechanical combination of the machinery.

2. I do not claim the weight or spring by which the trap may be set in motion, nor the separate springs or wheels by which it acts, but simply the mechanical combination of the machinery as described in the foregoing specifications and drawings.

ROBERT S. CRAIG.

Witnesses:
JAMES BIRNEY,
CHAS. B. BOYLE.